Figure 1:
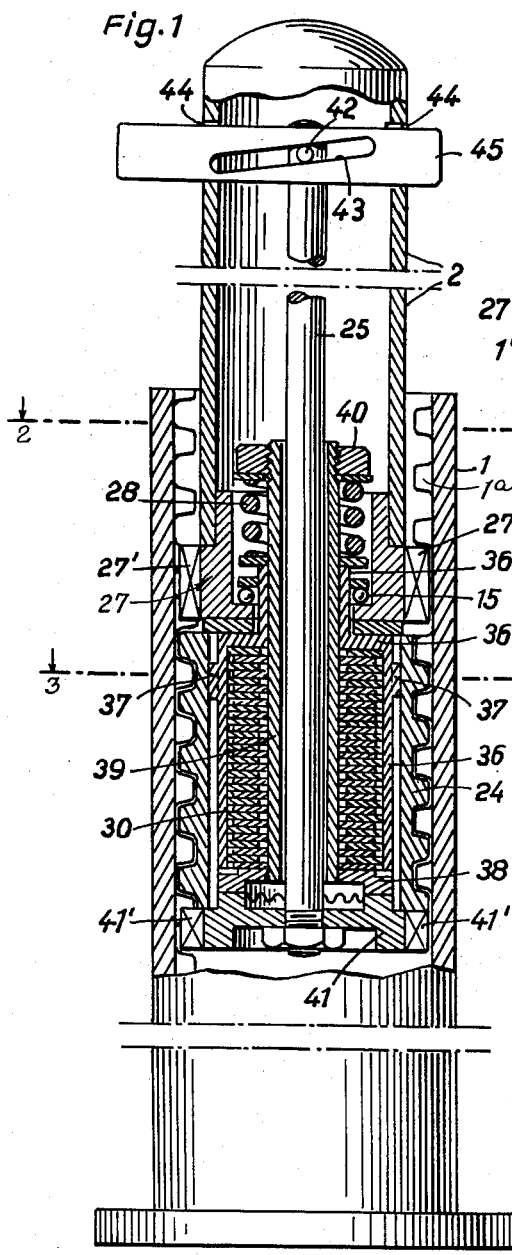

May 29, 1956 — A. SCHUBERT — 2,747,829
MINE PROP
Filed Dec. 7, 1951

Inventor:
ALEXANDER SCHUBERT
BY
ATTORNEY

United States Patent Office 2,747,829
Patented May 29, 1956

2,747,829

MINE PROP

Alexander Schubert, Dortmund-Scharnhorst, Germany

Application December 7, 1951, Serial No. 260,519

Claims priority, application Germany June 9, 1951

4 Claims. (Cl. 248—355)

The invention relates to a mine prop composed of a lower outer and an upper inner prop member.

In mime props of the above designated type, the lower hollow prop member is generally provided with an inner thread and the upper prop member engages with a unit structure in the inner thread of the lower prop member.

For the purpose of assuring a reliable locking connection between the two prop members and certain additional purposes, which will become apparent as the description proceeds, brake discs are often used.

It is one of the primary objects of the invention to eliminate certain shortcomings to these known prop constructions and to improve the same in conformity with certain operative requirements, particularly also with the higher pressure conditions prevailing in modern mining work.

It is also an object of the invention to provide means whereby the prop may be easily adapted to operational changes. The instant prop has the great advantage that it is free of parts which may be easily lost.

It is also an important object of the invention to guarantee the desired frictional contact in the stationary state and during the displacement of the prop by a proper consideration of the differential frictional resistance.

By a suitable selection of the friction surfaces and the friction coefficient, the path of the prop during its downward movement and the speed thereof may be predetermined.

With the above recited objects and purposes in view, the invention will now be described with reference to the accompanying drawings illustrating several preferred embodiments thereof without however, in any way, restricting the same to the shown and described modifications, save as limited in the claims.

In the drawings—

Figure 2:
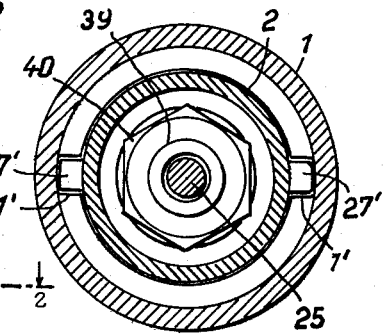
Figure 3:
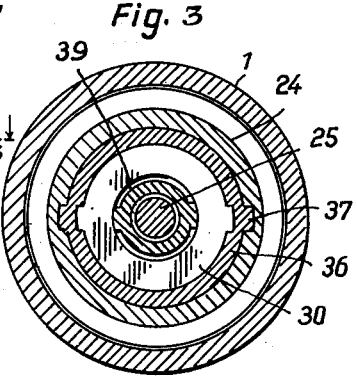
Figure 4:
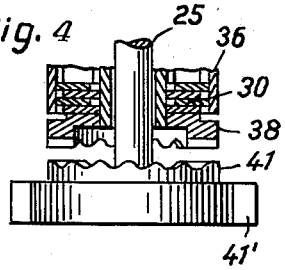

Fig. 1 is a vertical sectional view of the mine prop forming the subject matter of this invention, Fig. 2 is a sectional view taken on line 2—2 of Fig. 1, Fig. 3 is a sectional view taken on line 3—3 of Fig. 1, Fig. 4 is a fragmentary sectional view of a clutch forming a part of the instant mine prop and illustrating the same in a disengaged position.

As apparent from Fig. 1, the upper prop member 2 is secured against rotation in the lower prop member 1 provided with an inner thread 1a by means of an annular support 27 and groove and tongue 27'.

A sleeve 36 is located in the inner cavity of the lock unit 24; this sleeve 36 accommodates a large number of slidable friction rings 30 which are arranged in the manner of a lamellar clutch; the sleeve 36 is secured against rotation relative to the lock unit 24 by a tongue-and-groove connection 37. The rings 30 of the clutch are supported between a cover portion 36' of the sleeve 36 and a flange 38; said flange 38 is solidly connected to a sleeve or bushing 39 that extends through the lamellar clutch and carries at its upper end a nut 40.

A strong spring 28 is located between the nut 40 and an end piece 36'' of the sleeve 36, which projects into the upper prop member 2, and the spring 28 exerts upon the lamellar clutch the pressure which is required for the braking of the lock unit 24. Instead of positioning the clutch in a sleeve, the rings 30 may be directly located in the lock unit 24; the latter may in this case consist of one piece with the cover portion 36' and the end piece 36''. The rings 30 project in this case alternately into a groove of the inner wall of the lock unit 24 and, respectively, engage the bushing 39.

The flange 38 is at its lower face provided with a serration that is disposed opposite a serrated clutch disc 41 for interaction. The clutch disc 41 is secured against rotation by tenons 41' that are slidable in longitudinal grooves of the outer prop member 1. The clutch disc 41 is carried by the rod 25, and coupling and uncoupling is effected by lowering and lifting of the rod 25. For this purpose, the rod 25 carries a bolt 42, which projects through an inclined slot 43 of a wedge 45 which is adapted to be pushed in opposite directions in the openings 44 provided in the inner prop member 2. The displaceable wedge 45 may be replaced by a rotatable eccentric to effect the lifting and lowering of the rod 25.

The described structure is operated, as follows.

The lamellar clutch is permanently exposed to the pressure of spring 28, also if the lock unit 24 is loosened. The rotation of this unit and the lowering of the upper prop member 2 is prevented at normal pressure conditions by the coupling of the serrations of the flange 38, which is exposed to the braking resistance, with the non-rotatable clutch disc 41.

Therefore, in this position a sinking is possible only by lowering the clutch disc 41 by means of the rod 25; and the lock unit 24 as well as the lamellar clutch which are exposed to equal pressure, may be rotated by the pressure exerted on the upper prop member 2. The rotation is facilitated by a ball bearing 15. By the positive guidance of the bolt 42, the coupling 41 is fixed in its respective positions.

It is apparent that a short blow against the loosening wedge 45 suffices to enable the removal of the props, whereby the lock unit 24 is immediately freed independently of the lamellar clutch which may still be under pressure.

The lamellar clutch 30 serves the only purpose to produce a continuous transmission of force between the center rod 25 and the upper prop 2 and the locking unit or thread 24. This junction can only be disconnected by the coupling 38, 41 by pressing down the rod 25 and the coupling disc 41. The locking thread 24 is freely turnable, since it is only connected to the sleeve 36 and through the lamellar clutch 30 to the sleeve or bushing 39. This bushing, however, can freely turn about the rod 25 and is for this purpose supported on a ball bearing 15, the balls of which greatly facilitating the rotation. In order to fully visualize the action of the lock unit 24 it suffices to consider the lamellar clutch 30 as a rigid connection.

Upon removal of the prop, the upper prop member 2 tends to sink down due to its weight; in so doing it presses upon sleeve 36 and locking unit 24, which by the action of this pressure commences to rotate and accordingly takes along the lamellar clutch 30 and the bushing 39.

The coupling 38, 41, would upon locking of the nut 40 create a rigid connection between the upper and lower prop member, since the coupling parts 38, 41 rigidly interlock. However, a rigid connection between the upper and lower prop member is unusable, since the prop must be able to yield if the rock pressure exceeds a certain limit. As the coupling 38, 41 does not permit this yield, the lamellar clutch 30 is provided, whereby the upper prop member 2 may sink into the lower prop member 1 to a limited extent, when the rock pressure surpasses a certain limit. The action of the spring 28 must be adjusted to the pressure limit. If the rock pressure increases beyond this limit, the spring 28 is compressed and the lamellar clutch 30 is slightly loosened or disengaged. Therefore, the locking unit 24 may rotate to a certain degree together with the sleeve 36 rigidly connected therewith, whereas the bushing 39 and, due to the rigid coupling 38, 41, also the rod 25 does not join in this rotation. By the sinking of the upper prop member the spring 28 regains its play and compresses the lamellar clutch 30, whereby the rotation of the locking screw 24 and further sinking of the upper prop member 2 is prevented.

In order to set the operator loosens the top lock; with this purpose in view the wedge 45 is displaced towards the right, whereby the rod 25 and the coupling disc 41 are lowered. The coupling 38, 41 is loosened; the upper prop member 2 may now be freely lowered into the lower prop member 1. The upper prop member is now lifted for its adjustment in the customary manner and the wedge 45 is pressed towards the left side whereby the coupling 38, 41 is engaged; the portion of the upper prop member cannot be changed anymore.

The lifting of the upper prop member 2 may be effected in the usual manner either manually or by means of generally known devices, for instance, by blowing in the lower prop member compressed air. Since adjusting devices are generally known and usually accompany the prop, they are set upon the upper rim of the lower prop member 1.

The clutch parts 38 or 41 may be constructed in any suitable known manner. The serration used in connection with the above described embodiment of the invention may be replaced by a jaw or other type of coupling element.

The above described props may preferably be made of light weight metals.

Since certain changes may be made in the above article and different embodiments of the invention could be made without departing from the scope thereof, it is intended that all matter contained in the above description or shown in the accompanying drawing shall be interpreted as illustrative and not in a limiting sense.

Having thus described the invention, what I claim as new and desire to be secured by Letters Patents, is as follows:

1. In a tubular mine prop, an outer tubular prop member having on its interior a thread, an inner tubular prop member displaceable axially relative to said outer prop member in response to rock pressure and having an end portion disposed on the interior of said outer prop member, said prop members being non-rotational relative to each other, a hollow rotatable lock unit adjacent said inner prop member and taking up the pressure thereof and comprising an external thread engaged in said thread of said outer prop member and turnable on said thread relative to said prop members for axial displacement of said inner prop member, and releasable clutch means operable for releasably retarding and arresting and, respectively releasing the rotational movement of said lock unit comprising an element disposed adjacent said lock unit oppositely of said inner prop member and being non-rotational against said prop members and being displaceable axially of said outer prop member between a braking position and a release position, respectively, a bushing disposed in said lock unit defining therewith an interior chamber, a series of lamellae superposed in said chamber and alternate of said lamellae being in rotational driving connection with said lock unit and the other of said lamellae being in rotational driving connection with said bushing, a releasable clutch between said bushing and said element and operable for connecting said bushing to said element in the braking position of said element thereby restraining rotation of said bushing for braking the rotation of said lock unit by said lamellae, and respectively being disengaged from said element in the release position of said element for unobstructed rotation of said lock unit and said bushing, spring means operable for resiliently pressing said lamellae together to increase the friction therebetween, and means operable for shifting said element between said positions.

2. In a tubular mine prop, as claimed in claim 1, said thread having longitudinal grooves axially on the interior of said outer prop member, said inner prop member and said element comprising tongues disposed in said grooves for axial sliding movement and for restraining rotational movement.

3. In a tubular mine prop, as claimed in claim 1, an auxiliary sleeve member disposed in said chamber and slidable in said lock unit and rotatable therewith and being non-rotatably connected to said alternate lamellae, said spring being arranged between said bushing and said auxiliary sleeve member, and means operable for adjustably pretensioning said spring.

4. In a tubular mine prop, as claimed in claim 1, said shifting means comprising a rod connected to said element and extending on the interior of said bushing through the interior of said inner prop member beyond said outer prop member.

References Cited in the file of this patent

UNITED STATES PATENTS

| | | |
|---|---|---|
| 2,540,752 | Negovon | Feb. 6, 1951 |
| 2,584,022 | Johnson | Jan. 29, 1952 |

FOREIGN PATENTS

| | | |
|---|---|---|
| 536,234 | Great Britain | May 7, 1941 |
| 802,812 | Germany | Feb. 26, 1951 |
| 811,106 | Germany | Aug. 16, 1951 |